United States Patent
Peipelman et al.

(10) Patent No.: US 12,112,137 B2
(45) Date of Patent: Oct. 8, 2024

(54) GENERATING TARGETED MESSAGE DISTRIBUTION LISTS

(71) Applicant: International Business Machines Corporation, Armonk, NY (US)

(72) Inventors: Jason L. Peipelman, Travis, TX (US); Erica Banda, Willis, TX (US); Rolf Kocheisen, Leander, TX (US); Eric Vermeer, Leander, TX (US); Debora Yang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 17/363,120

(22) Filed: Jun. 30, 2021

(65) Prior Publication Data

US 2023/0004725 A1     Jan. 5, 2023

(51) Int. Cl.
*G06F 40/35*     (2020.01)
*H04L 51/42*     (2022.01)

(52) U.S. Cl.
CPC ............ *G06F 40/35* (2020.01); *H04L 51/42* (2022.05)

(58) Field of Classification Search
None
See application file for complete search history.

(56) References Cited

U.S. PATENT DOCUMENTS

| | | | |
|---|---|---|---|
| 6,816,863 B2 | 11/2004 | Bates | |
| 7,395,316 B2 | 7/2008 | Ostertag | |
| 9,811,399 B1 * | 11/2017 | Bradley | ............... G06F 16/951 |
| 10,264,081 B2 | 4/2019 | Guo | |
| 2005/0060643 A1 * | 3/2005 | Glass | ................... H04L 51/212 |
| | | | 715/205 |

(Continued)

FOREIGN PATENT DOCUMENTS

KR     1020160009718 A     1/2016

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Schquita D Goodwin
*Assistant Examiner* — Ishrat Rashid
(74) *Attorney, Agent, or Firm* — Aaron N. Pontikos (57) ABSTRACT

An approach for generating a distribution list. The approach analyzes a message associated with a user to create a message bag of words (BOW). The approach can analyze a history of messages associated with the user to create a plurality of history message BOWs. The approach can calculate similarity factors between the message BOW and the plurality of history BOWs, respectively. If a similarity factor is ">=" a predetermined similarity threshold, the approach can add a history message to a similar message list. The approach can calculate interest factors, based on the similarity factors, for contacts associated with the similarity factors in the similar message list. If an interest factor is ">=" a predetermined interest threshold, the approach can add a contact associated with the interest factor to a suggested contact list. The approach can prioritize the suggested contact list and insert the list as a distribution list.

17 Claims, 6 Drawing Sheets

(56) References Cited

U.S. PATENT DOCUMENTS

| | | | |
|---|---|---|---|
| 2009/0132670 A1* | 5/2009 | Syiek | H04L 51/48 |
| | | | 709/206 |
| 2012/0166999 A1* | 6/2012 | Thatcher | G06F 3/0237 |
| | | | 715/780 |
| 2012/0330951 A1 | 12/2012 | Chakra | |
| 2016/0323398 A1 | 11/2016 | Guo | |
| 2017/0039296 A1* | 2/2017 | Bastide | H04L 51/234 |
| 2018/0048613 A1 | 2/2018 | Abou Mahmoud | |
| 2019/0158443 A1* | 5/2019 | Liao | H04L 41/0896 |
| 2019/0245972 A1* | 8/2019 | Dwyer | G06F 21/6254 |
| 2019/0281001 A1* | 9/2019 | Miller | G06N 20/00 |
| 2020/0037038 A1* | 1/2020 | Shoop | H04N 21/478 |

OTHER PUBLICATIONS

"IBM Watson products", IBM, downloaded from the internet on Apr. 4, 2022, 17 pages, <https://www.ibm.com/watson/products-services>.

\* cited by examiner

GENERATING TARGETED MESSAGE DISTRIBUTION LISTS

TECHNICAL FIELD

The present invention relates generally to creating distribution lists, and more specifically, creating a topic/event distribution list based on previous interest in the topic/event.

BACKGROUND

When scheduling an event, it is difficult to prepare an invitation list for the event without inadvertently excluding people from the list that should have been invited. In general, a manual search is performed of old texts and/or emails to find discussions about similar events and topics and a distribution list is built by remembering or writing down the names associated with the identified texts and or emails.

This process takes a significant amount of time and is error prone because of the manual operation. Accordingly, people of interest are still excluded from the mailing list either because they were missed in the manual search of user identities, or their identifying monikers were incorrectly entered for inclusion in the list.

Attempts have been made to solve this problem by applications such as Google Circles, a Facebook private group and static/dynamic distribution lists. Each of these attempts has the same general problems, they require manual creation and participant interest must be tracked manually to maintain an accurate and useful distribution list.

A need has arisen for a self-generating and self-maintaining event distribution list.

BRIEF SUMMARY

According to an embodiment of the present invention, a computer-implemented method for generating a distribution list, the computer-implemented method comprising: analyzing a message associated with a user to create a message bag of words (BOW); analyzing a history of messages associated with the user to create a plurality of history BOWs; calculating similarity factors between the message BOW and the plurality of history BOWs, respectively; responsive to a similarity factor equal to or greater than a predetermined similarity threshold, adding a history message associated with the similarity factor to a similar message list; calculating interest factors, based on the similarity factors, for contacts associated with the similarity factors in the similar message list; responsive to an interest factor equal to or greater than a predetermined interest threshold, adding a contact associated with the interest factor to a suggested contact list; prioritizing the suggested contact list based on the interest factor; and inserting the suggested contact list as a distribution list.

According to an embodiment of the present invention, a computer program product for generating a distribution list, the computer program product comprising: one or more non-transitory computer readable storage media and program instructions stored on the one or more non-transitory computer readable storage media, the program instructions comprising: program instructions to analyze a message associated with a user to create a message bag of words (BOW); program instructions to analyze a history of messages associated with the user to create a plurality of history BOWs; program instructions to calculate similarity factors between the message BOW and the plurality of history BOWs, respectively; responsive to a similarity factor equal to or greater than a predetermined similarity threshold, program instructions to add a history message associated with the similarity factor to a similar message list; program instructions to calculate interest factors, based on the similarity factors, for contacts associated with the similarity factors in the similar message list; responsive to an interest factor equal to or greater than a predetermined interest threshold, program instructions to add a contact associated with the interest factor to a suggested contact list; program instructions to prioritize the suggested contact list based on the interest factor; and program instructions to insert the suggested contact list as a distribution list.

According to an embodiment of the present invention, a computer system for generating a distribution list, the computer system comprising: one or more computer processors; one or more non-transitory computer readable storage media; and program instructions stored on the one or more non-transitory computer readable storage media, the program instructions comprising: program instructions to analyze a message associated with a user to create a message bag of words (BOW); program instructions to analyze a history of messages associated with the user to create a plurality of history BOWs; program instructions to calculate similarity factors between the message BOW and the plurality of history BOWs, respectively; responsive to a similarity factor equal to or greater than a predetermined similarity threshold, program instructions to add a history message associated with the similarity factor to a similar message list; program instructions to calculate interest factors, based on the similarity factors, for contacts associated with the similarity factors in the similar message list; responsive to an interest factor equal to or greater than a predetermined interest threshold, program instructions to add a contact associated with the interest factor to a suggested contact list; program instructions to prioritize the suggested contact list based on the interest factor; and program instructions to insert the suggested contact list as a distribution list.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of dynamically analyzing previous messages and discussion to automatically generate a suggested distribution list based on a weighted similarity score of past participant interest. It should be noted that previous messages can include, but is not limited to, received messages, e.g., an inbox in an email application, sent messages, e.g., a sent mail folder in an email application, draft messages, e.g., messages in a draft folder in an email application, etc. Similarly, previous messages can apply to text messages being sent, received and/or drafted or any other type of message system. Embodiments of the present invention can use key words, phrases, and themes found from previous communications by natural language processing (NLP) to identify similar interests. The NLP analysis can include the option of combining insights from multiple messaging sources such as, but not limited to, text message, email, Facebook, Twitter, etc. It should be noted that users of embodiments of the present invention can have significant customization capabilities associated with the NLP sources and their analysis.

Natural language processing is a subfield of computer science, information engineering, and artificial intelligence concerned with the interactions between computers and human languages. Specifically, how to program computers to process and analyze large amounts of presented natural language data. The process of analyzing a message can comprise tokenizing all words of the presented natural language, using Lemmatization/Stemming to eliminate different word forms, filtering out "stop words" (and, the, a, etc.) and creating a "bag of words" by eliminating all duplicates from the presented natural language.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
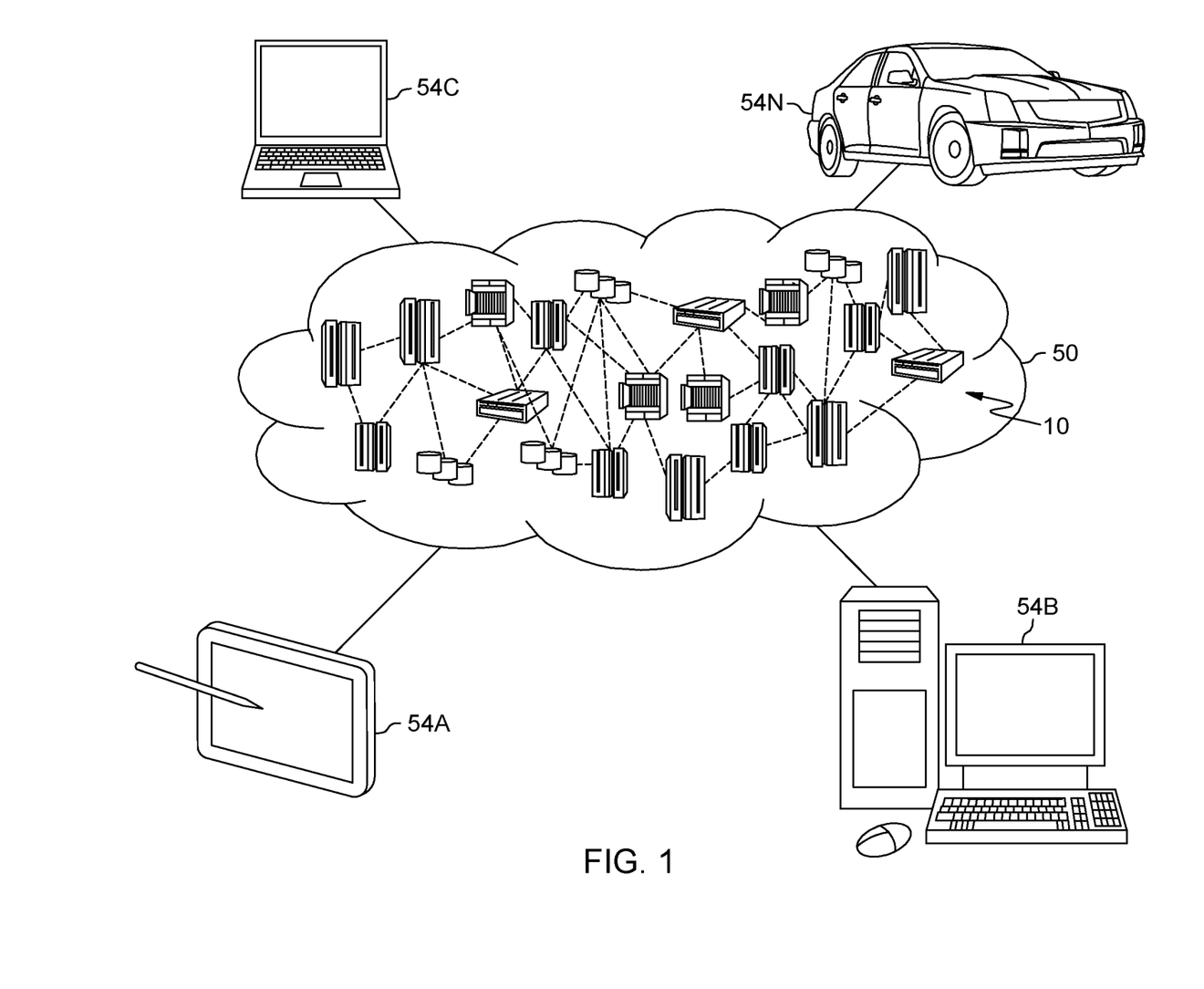
FIG. 1 depicts a cloud computing environment, according to embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
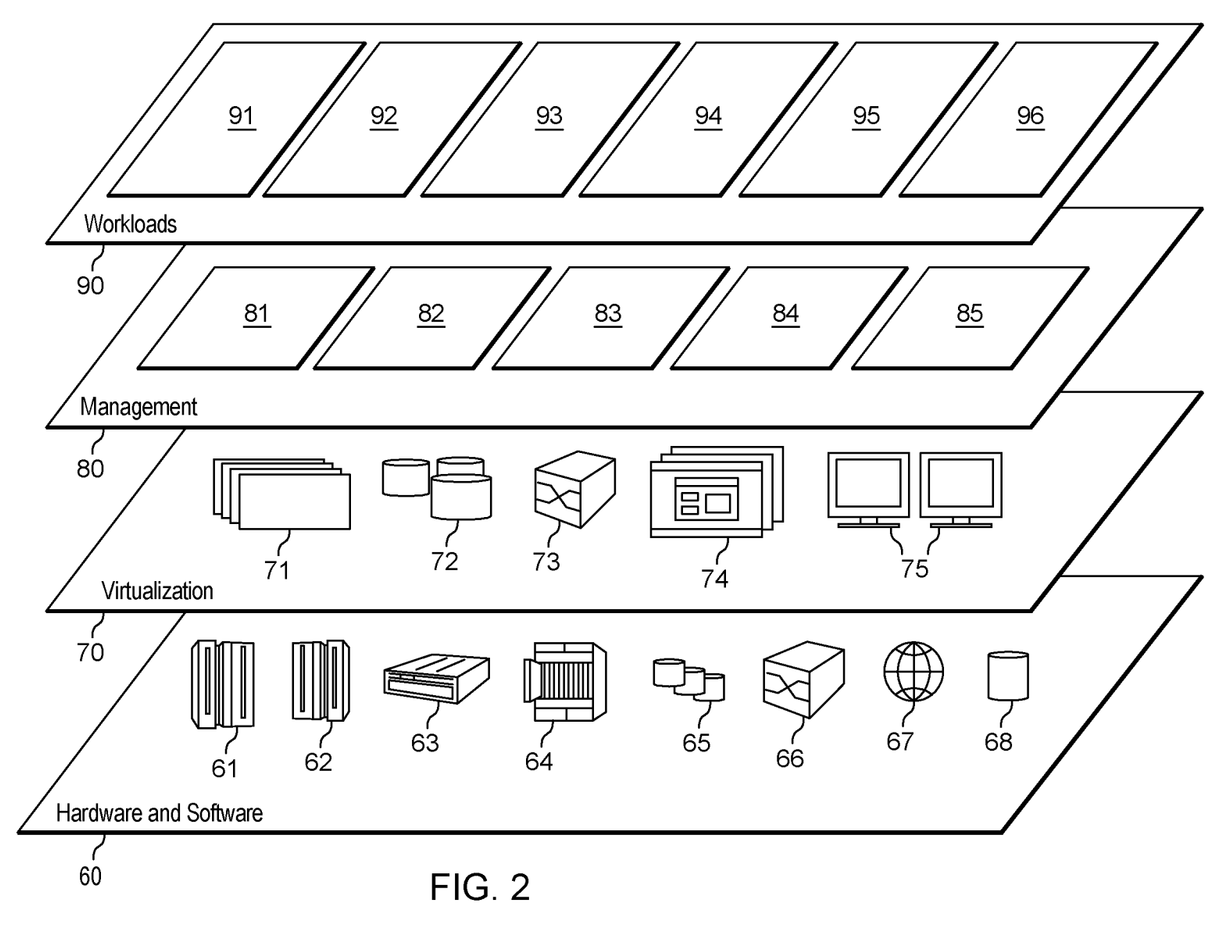
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and contact list generation management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
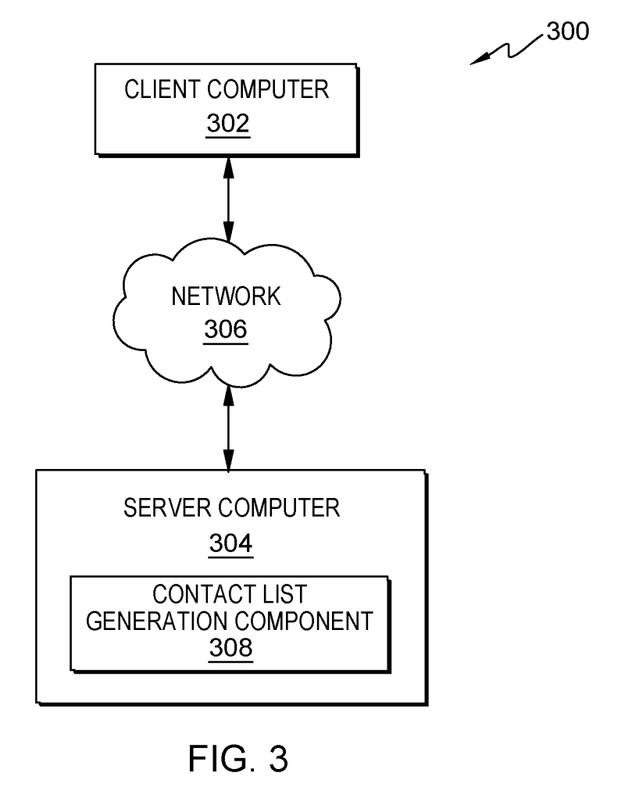
FIG. 3 is a high-level architecture, according to embodiments of the present invention.
Figure 4:
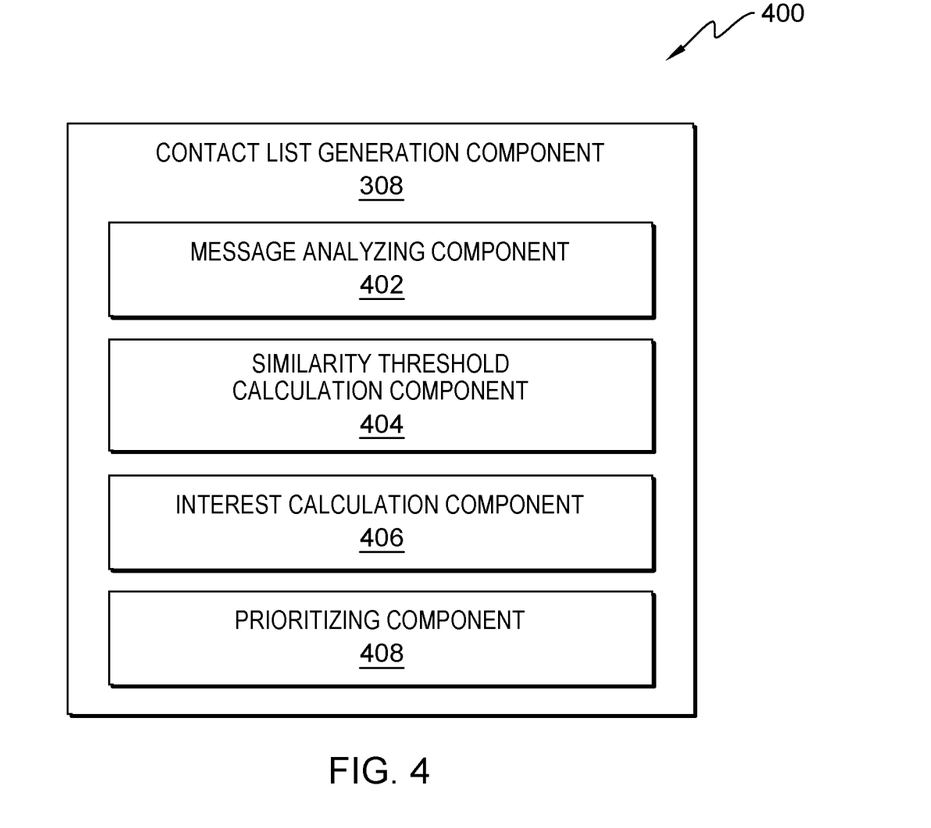
FIG. 4 is an exemplary detailed architecture, according to embodiments of the present invention.
Figure 5:
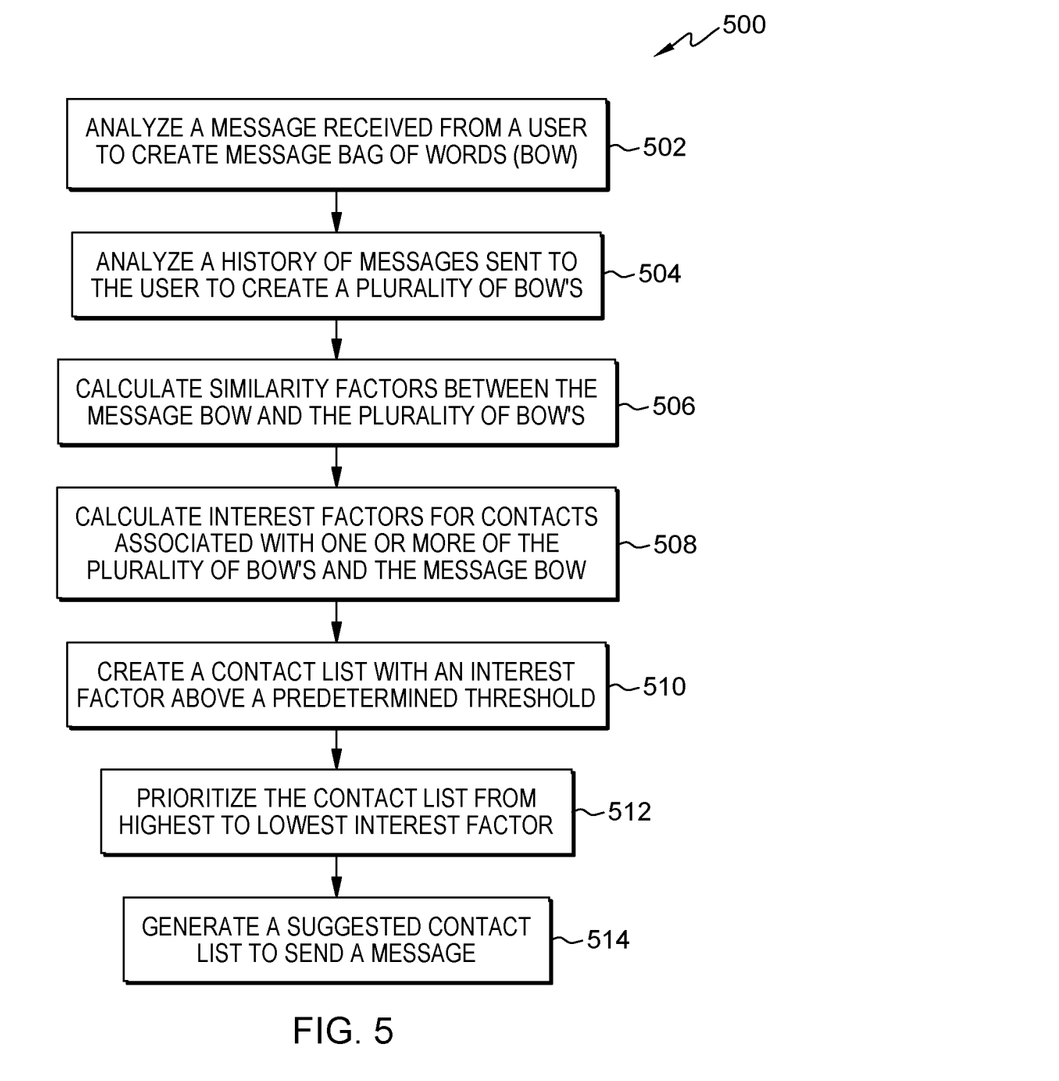
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a contact list generation system, to which the invention principles may be applied. The architecture 300 comprises a client computer 302, a contact list generation component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

Contact list generation component 308, operational on server computer 304, can receive a message typed by a user based on a user request to generate a suggested distribution list. Contact list generation component 308 can perform a key word and/or phrase analysis of the received message to generate a bag of words (BOW) associated with the message. Employing the BOW, contact list generation component 308 can search through a history, e.g., text messages, emails, contacts, etc., associated with the user for words in the history related to words in the BOW. Contact list generation component 308 can score contacts associated with the words in the history based on matching words in the BOW in view of a customizable weighted threshold. Contact list generation component 308 can generate a prioritized suggested contacts list based on the contact scores and a predetermined threshold.

In another aspect of an embodiment, contact list generation component 308 can enable/disable scaling factors which tune the similarity and interest algorithms to assist in growing or shrinking the social circle. For example, scaling up would rank contacts higher if they are in a fewer number of messages, i.e., a contact that would be more likely to be forgotten to be included in the distribution list, and scaling down would rank contacts higher if they are in a greater number of messages, i.e., a contact that is in a relationship that matters the most. It should be noted that scaling factors can be enabled/disabled based on individual contacts, user selected groups of contacts or globally to all contacts.

In another aspect of an embodiment, contact list generation component 308 can provide the capability to configure "inclusion list" or "exclusion list" of contacts for suggested contact generation. For example, an inclusion list is a list of contacts that should always be included in a suggested contact list, e.g., a spouse, and an exclusion list of contacts that should never be included in a suggested contacts list, e.g., a contact that expressed they are no longer interested in inclusion.

In another aspect of an embodiment, contact list generation component 308 can provide the capability for tag generation and automatically creating and/or updating static distribution lists. In alternative embodiments of the present invention, contact list generation component 308 can dynamically search for key words and phrases to identify and automatically tag messages and/or participants. Further, contact list generation component 308 can provide the capability to search through historical messages while filtering to relevant messages for the purpose of identifying interested contacts to automatically apply tags and generate static distribution lists.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a contact list generation component 308, which can further comprise a message analyzing component 402, a similarity threshold calculation component 404, an interest calculation component 406, and a prioritizing component 408.

In one aspect of an embodiment of the present invention, message analyzing component 402 can receive a message from a user. It should be noted that the message can be a text message, an email, a voicemail (subsequently converted to a text message), etc. Message analyzing component 402 can use natural language processing (NLP) to create a "bag of words" (BOW) associated with the message. The BOW can contain key words, phrases, themes, etc. selected by the NLP that can be used to identify similar interests between the user and contacts associated with the user.

In another aspect of an embodiment of the present invention, message analyzing component 402 can perform a similar NLP analysis of a message history maintained by message analyzing component 402 for the user. The message history can contain groups of messages, grouped by a contact associated with the message, and message analyzing component 402 can create a BOW for each message in the group associated with the user. It should be noted that a BOW for a message can persist for reuse and can be updated as additional messages arrive on the message thread from the contact associated with the BOW.

Similarity threshold calculation component 404 can compare the BOW for the received message with the BOWs associated with the contacts and their group of messages based on calculating similarity factors for the message BOW and the contact message BOWs. The similarity threshold calculation component 404 can calculate a similarity factor based on dividing the number of matching words in the message BOW and the contact message BOW by the total number of words in the contact message BOW. If the calculated similarity factor is greater than a similarity threshold, then similarity threshold calculation component 404 can save the contact message and its similarity factor in a similar message list. It should be noted that similarity threshold calculation component 404 can repeat this calculation for each message in the message history unless a current BOW is available for a given message.

In another aspect of an embodiment of the present invention, interest calculation component 406 can calculate an interest factor in the received message of a contact. Interest calculation component 406 can calculate the contact interest based on summing the similarity factors in the similar message list for a contact divided by the total number of similarity factors in the similar message list for the contact. If the interest factor is greater than an interest threshold, then interest calculation component 406 can save the contact and the interest factor to a suggested contact list. It should be noted that multiple contacts can be associated with a particular message.

In another aspect of an embodiment of the present invention, prioritizing component 408 can prioritize the suggested contact list. Prioritizing component 408 can order the suggested contact list based on the interest factor from the highest valued interest factor to the lowest valued interest factor. It should be noted that the prioritization is user configurable and can be based on other factors such as, but not limited to, the number of similarity factor entries in the similar message list for a contact, etc. It should further be noted that prioritizing component 408 can insert the suggested contact list for distribution, e.g., for an email the suggested contact list can be inserted in the "Send To:" field as associated email addresses for distribution.

For example, Tom prepares a message "Going to baseball practice tonight at Pearce Field. You're welcome to join!" and requests a suggested contact list. Tom's contacts are Joe, Sally, Rick and Bob. Contact list generation component 308 can generate a BOW for the message comprising terms "baseball, field, practice, join, . . . " Contact list generation component 308 can also generate contact message-based BOWs (not shown) for the history messages maintained by contact list generation component 308, for any messages without a currently prepared BOW.

Contact list generation component 308 can calculate similarity factors between Tom's message BOW and the BOWs associated with the messages in the message history, e.g., history message (HM) 1 has contacts Joe and Sally with a calculated similarity factor of 0.9; HM 2 has contacts Joe, Sally and Rick with a calculated similarity factor of 0.1; HM 3 has contact Rick with a calculated similarity factor of 0.1; HM4 has contacts Joe, Sally and Bob with a calculated similarity factor of 0.9; HM5 has contacts Joe and Sally with a calculated similarity factor of 0.5; and HM 6 has contact Rick with a calculated similarity factor of 0.0.

Contact list generation component 308 can compare the historical message similarity factors to a predetermined similarity threshold, e.g., 0.5, and if a historical message similarity factor is greater than or equal to the predetermined similarity threshold, then contact list generation component 308 can add the message and the associated contact(s) to a similar message list, e.g., HM1, HM4 and HM5 are added to the similar message list.

Contact list generation component 308 can calculate interest factors for the contacts based on the similarity factors, e.g., Joe is a contact in HM1, HM4 and HM5 so his interest factor is (0.9+0.9+0.5)/3 which equals 0.76 or 76%; Sally is a contact in HM1, HM4 and HM5 so her interest factor is (0.9+0.9+0.5)/3 which equals 0.76 or 76%; and Bob a is contact in HM4 so his interest factor is (0.9)/3 which equals 0.30 or 30%.

Contact list generation component 308 can compare the interest factors to a predetermined interest threshold, e.g., 0.25, and if an interest factor is greater than or equal to the predetermined interest threshold, then contact list generation component 308 can add the associated contact to a suggested contact list, e.g., Joe, Sally and Bob are added to the similar message list. It should be noted that Joe and Sally have identical priorities in the suggested contact list so they will occupy a shared position in the suggested contact list.

FIG. 5 is an exemplary flowchart of a method 500 for generating a suggested contact list. At step 502, an embodiment can analyze, via message analyzing component 402, a message received from a user to create a message "bag of words" (BOW). At step 504, the embodiment can analyze, via message analyzing component 402, a history of messages sent to the user to create a plurality of BOWs. At step 506, the embodiment can calculate, via similarity threshold calculation component 404, similarity factors between the message BOW and the plurality of BOWs. At step 508, the embodiment can calculate, via interest calculation component 406, interest factors associated with one or more of the plurality of BOWs and the message BOW. At step 510, the embodiment can create, via interest calculation component 406, a contact list with contacts having an interest factor at or above a predetermined threshold. At step 512, the embodiment can prioritize, via prioritizing component 408, the contact list from highest to lowest interest factor. At step 514, the embodiment can generate, via prioritizing component 408, the suggested contact list to distribute the message.

Figure 6:
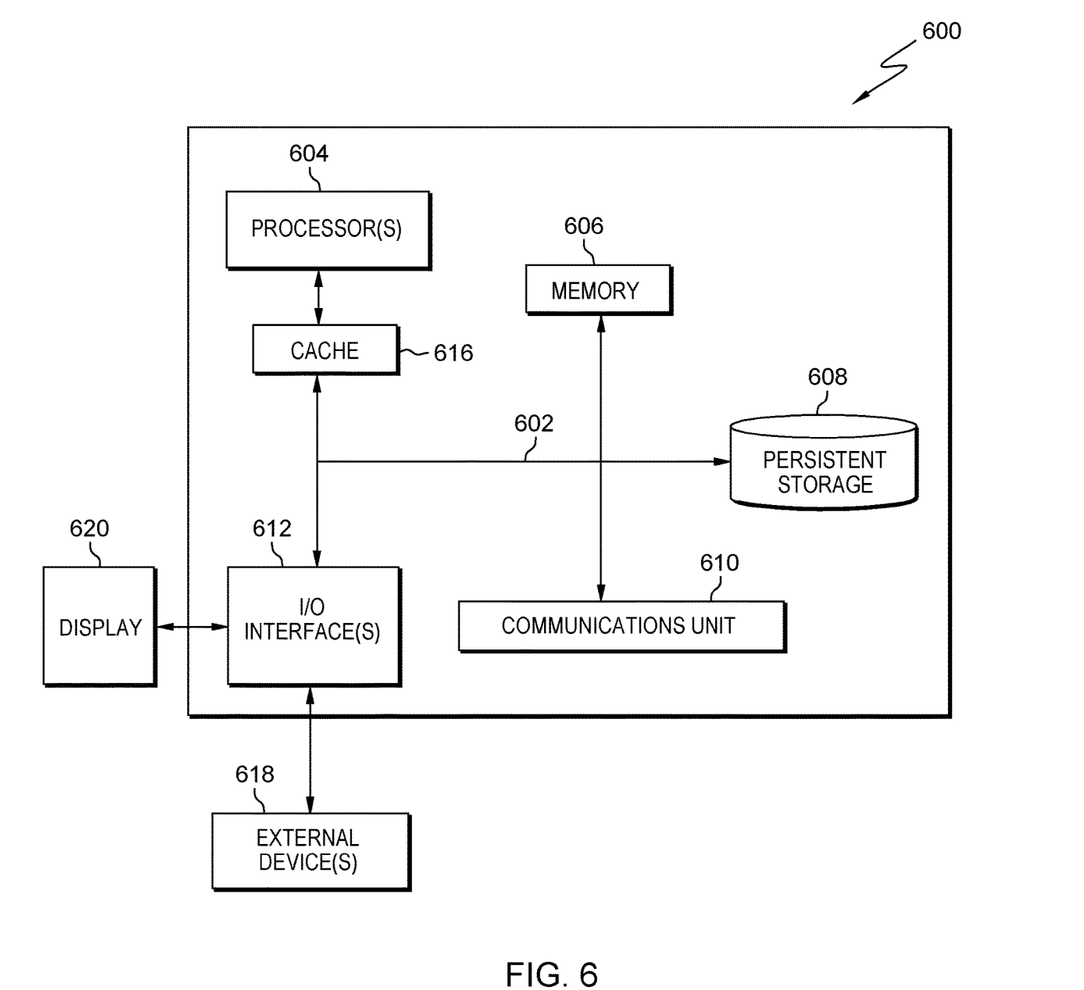
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O inter-face(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a distribution list, the computer-implemented method comprising:
    analyzing a message associated with a user to create a message bag of words (BOW);
    analyzing history messages associated with the user to create a plurality of history BOWs;
    calculating similarity factors between the message BOW and the plurality of history BOWs, respectively;
    persisting the message BOW to reuse and update based on additional messages arriving on a message thread from a contact associated with the message BOW;
    responsive to a similarity factor equal to or greater than a predetermined similarity threshold, adding a history message associated with the similarity factor to a similar message list;
    calculating interest factors, based on the similarity factors, for contacts associated with the similarity factors in the similar message list, wherein calculating the interest factors further comprises:
        scaling an interest factor inversely proportional to a number of the history messages associated with the contact when scaling up is enabled, and
        scaling an interest factor proportional to the number of the history messages associated with the contact when scaling down is enabled;
    responsive to an interest factor equal to or greater than a predetermined interest threshold, adding a contact associated with the interest factor to a suggested contact list;
    prioritizing the suggested contact list based on the interest factor and the number of similarity factor entries in the similar message list of a contact; and
    inserting the suggested contact list as a distribution list into a delivery address of an email.

2. The computer-implemented method of claim 1, wherein the message BOW is created based on a natural language processing of the message.

3. The computer-implemented method of claim 1, wherein the similarity factor is calculated as a weighted average based on a number of similar words between the message BOW and a history BOW divided by the number of words in the history BOW.

4. The computer-implemented method of claim 1, wherein the interest factor is calculated as a weighted average based on a sum of a number of history messages associated with a contact in the similar message list divided by a total number of messages in the similar message list.

5. The computer-implemented method of claim 1, further comprising:
adding the contacts from an inclusion list to the suggested contact list; and
removing any contact in the suggested contacts list matching a contact in an exclusion list.

6. The computer-implemented method of claim 1, further comprising:
generating one or more tags associated with the history messages based on the message BOW; and
generating a static distribution list for the message.

7. A computer program product for generating a distribution list, the computer program product comprising:
one or more non-transitory computer readable storage media and program instructions stored on the one or more non-transitory computer readable storage media, the program instructions comprising:
program instructions to analyze a message associated with a user to create a message bag of words (BOW);
program instructions to analyze history messages associated with the user to create a plurality of history BOWs;
program instructions to calculate similarity factors between the message BOW and the plurality of history BOWs, respectively;
program instructions to persist the message BOW to reuse and update based on additional messages arriving on a message thread from a contact associated with the message BOW;
responsive to a similarity factor equal to or greater than a predetermined similarity threshold, program instructions to add a history message associated with the similarity factor to a similar message list;
program instructions to calculate interest factors, based on the similarity factors, for contacts associated with the similarity factors in the similar message list, wherein the program instructions to calculate the interest factors further comprise instructions to:
scale an interest factor inversely proportional to a number of the history messages associated with the contact when scaling up is enabled, and
scale an interest factor proportional to the number of the history messages associated with the contact when scaling down is enabled;
responsive to an interest factor equal to or greater than a predetermined interest threshold, program instructions to add a contact associated with the interest factor to a suggested contact list;
program instructions to prioritize the suggested contact list based on the interest factor and the number of similarity factor entries in the similar message list of a contact; and
program instructions to insert the suggested contact list as a distribution list into a delivery address of an email.

8. The computer program product of claim 7, wherein the message BOW is created based on a natural language processing of the message.

9. The computer program product of claim 7, wherein the similarity factor is calculated as a weighted average based on a number of similar words between the message BOW and a history BOW divided by a number of words in the history BOW.

10. The computer program product of claim 7, wherein the interest factor is calculated as a weighted average based on a sum of a number of history messages associated with a contact in the similar message list divided by a total number of messages in the similar message list.

11. The computer program product of claim 7, further comprising:
program instructions to add the contacts from an inclusion list to the suggested contact list; and
program instructions to remove any contact in the suggested contacts list matching a contact in an exclusion list.

12. The computer program product of claim 7, further comprising:
program instructions to generate one or more tags associated with the history messages based on the message BOW; and
program instructions to generate a static distribution list for the message.

13. A computer system for generating a distribution list, the computer system comprising:
one or more computer processors;
one or more non-transitory computer readable storage media; and
program instructions stored on the one or more non-transitory computer readable storage media, the program instructions comprising:
program instructions to analyze a message associated with a user to create a message bag of words (BOW);
program instructions to analyze history messages associated with the user to create a plurality of history BOWs;
program instructions to calculate similarity factors between the message BOW and the plurality of history BOWs, respectively;
program instructions to persist the message BOW to reuse and update based on additional messages arriving on a message thread from a contact associated with the message BOW;
responsive to a similarity factor equal to or greater than a predetermined similarity threshold, program instructions to add a history message associated with the similarity factor to a similar message list;
program instructions to calculate interest factors, based on the similarity factors, for contacts associated with the similarity factors in the similar message list, wherein the program instructions to calculate the interest factors further comprise instructions to:
scale an interest factor inversely proportional to a number of the history messages associated with the contact when scaling up is enabled, and
scale an interest factor proportional to the number of the history messages associated with the contact when scaling down is enabled;
responsive to an interest factor equal to or greater than a predetermined interest threshold, program instructions to add a contact associated with the interest factor to a suggested contact list;
program instructions to prioritize the suggested contact list based on the interest factor and the number of similarity factor entries in the similar message list of a contact; and program instructions to insert the suggested contact list as a distribution list into a delivery address of an email.

14. The computer system of claim 13, wherein the message BOW is created based on a natural language processing of the message.

15. The computer system of claim 13, wherein the similarity factor is calculated as a weighted average based on a number of similar words between the message BOW and a history BOW divided by a number of words in the history BOW.

16. The computer system of claim 13, wherein the interest factor is calculated as a weighted average based on a sum of the number of history messages associated with a contact in the similar message list divided by a total number of messages in the similar message list.

17. The computer system of claim 13, further comprising:
program instructions to add the contacts from an inclusion list to the suggested contact list; and
program instructions to remove any contact in the suggested contacts list matching a contact in the exclusion list.

* * * * *